United States Patent [19]

Love et al.

[11] 4,445,877
[45] May 1, 1984

[54] ADJUSTABLE LENGTH DRIVE BELT FOR VEHICLE BELT PULLEY SYSTEM

[76] Inventors: Michael Love, 2235 Arthur St., Merrick, N.Y. 11566; Philip Forman, 39 Saratoga Dr., Jericho, N.Y. 11753

[21] Appl. No.: 353,362

[22] Filed: Mar. 1, 1982

[51] Int. Cl.³ .................... F16G 1/00; F16G 5/00; F16L 3/08; B65D 63/00

[52] U.S. Cl. .................... 474/255; 24/16 PB; 24/36; 24/33 V; 24/188; 474/273

[58] Field of Search .............. 474/253, 255, 257; 24/38, 36, 31 R, 31 L, 33 V, 33 M, 170, 178, 188, 194, 16 PB; 248/74.3, 74.5

[56] References Cited

U.S. PATENT DOCUMENTS

| | | | |
|---|---|---|---|
| 941,136 | 11/1909 | Dubois | 24/188 |
| 1,426,796 | 8/1922 | Walker | 474/225 |
| 2,591,648 | 4/1952 | White et al. | 24/194 |
| 3,074,132 | 1/1963 | Beach | 24/33 M |
| 3,162,914 | 12/1964 | Ireland | 24/170 |
| 3,192,584 | 7/1965 | Pape | 24/16 PB |
| 3,408,699 | 11/1968 | Reynolds | 24/16 PB |
| 3,680,380 | 8/1972 | Kurrle | 474/252 |
| 3,748,699 | 7/1973 | Cunningham | 24/38 |
| 3,788,156 | 1/1974 | Jackson | 474/255 |
| 3,834,245 | 9/1974 | Cultrera | 474/257 |
| 3,908,233 | 9/1975 | Caveney et al. | 24/16 PB |
| 4,031,766 | 7/1977 | Beck | 474/254 |
| 4,210,986 | 7/1980 | Williams | 24/170 |
| 4,254,666 | 3/1981 | Seredick | 474/253 |

FOREIGN PATENT DOCUMENTS

| | | | |
|---|---|---|---|
| 487522 | 4/1970 | Switzerland | 248/74.5 |
| 2487 | 4/1908 | United Kingdom | 24/194 |

Primary Examiner—Leslie A. Braun
Assistant Examiner—Michael D. Beonarek
Attorney, Agent, or Firm—John J. Swartz

[57] ABSTRACT

An adjustable pulley drive belt, comprising a flexible elongate band having a male end and an opposite end, which includes a receiver mechanism for receiving the male end; releasable securing mechanism mounted on the receiver mechanism for movement between a remote position, permitting movement of the male end relative to the receiver mechanism, and an operative position in which the securing mechanism bites the male end to prevent removal of said male end from the receiver mechanism.

1 Claim, 3 Drawing Figures

ADJUSTABLE LENGTH DRIVE BELT FOR VEHICLE BELT PULLEY SYSTEM

BACKGROUND OF THE INVENTION

1. FIELD OF THE INVENTION

This invention relates to an endless pulley drive belt and, more particularly, to mechanism for adjustably and releasably coupling distal ends of a length of belt material to form an endless pulley drive belt.

2. DESCRIPTION OF PRIOR ART, HISTORY AND OBJECTS OF INVENTION

Drive belts for motor vehicles are typically endless webs or bands which are trained around various pulleys. Different motor vehicles require different length drive belts. Automobile "parts stores", conventionally carry a plurality of different length endless belts to accommodate differing requirements. A complete inventory of different length drive belts is relatively expensive because the drive belts are individually packaged and require substantial storage space.

During automotive repair and maintenance, it is sometimes desirable to remove and/or replace an automobile drive belt. Heretofore, this typically required the adjustment of one or more of the pulleys around which the belt is trained. Drive belts also become worn with use and sometimes break at inappropriate times. With apparatus constructed according to the present invention, the belt can be repaired by coupling the distal belt ends together. With apparatus constructed according to the present invention, a drive belt merchant need not carry different length drive belts, having the same cross-sectional belt configuration, but need carry only a single roll of belt material which can be cut to the desired length. Accordingly, it is an object of the present invention to provide new and novel apparatus for detachably coupling opposite ends of a selected length of belt material.

It is a further object of the present invention to provide belt-coupling apparatus including a belt-gripping blade which will permit the distal belt ends to be moved toward each other to the desired adjusted positions, but which will inhibit separation of opposite belt ends.

A still further object of the present invention is to provide belt-coupling apparatus which includes a knife-gripping edge attached to one end of a length of belt material for gripping the opposite end of a length of belt material to couple the ends together.

Another object of the present invention is to provide a belt-coupling device which will permit the belt merchants to reduce inventory.

Another object of the present invention is to provide new and novel apparatus for coupling opposite ends of a broken fan belt, or the like.

Other objects and advantages of the present invention will become apparent to those of ordinary skill in the art, as the description thereof proceeds.

SUMMARY OF THE INVENTION

An adjustable pulley drive belt, comprising a flexible elongate band having a male end and an opposite end, which includes receiver mechanism for receiving the male end; releasable securing mechanism mounted on the receiver mechanism for movement between a remote position, permitting movement of the male end relative to the receiver mechanism, and an operative position in which the securing mechanism bites the male end to prevent removal of said male end from the receiver mechanism.

BRIEF DESCRIPTION OF DRAWINGS

The present invention may more readily be understood by reference to the accompanying drawings, in which.

DESCRIPTION OF THE PREFERRED EMBODIMENT

Figure 1:
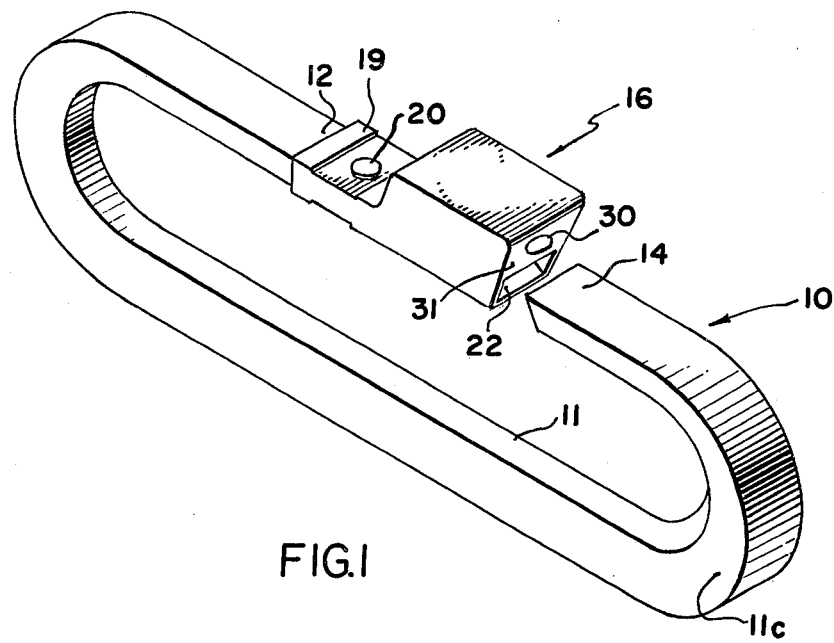
FIG. 1 is a perspective view of a pulley drive belt constructed according to the present invention.
Figure 2:
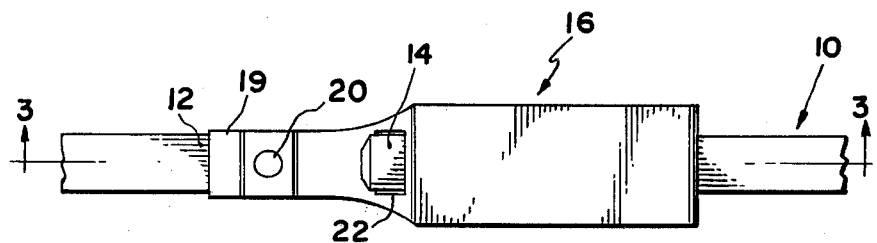
FIG. 2 is a fragmentary top plan view thereof.

A pulley drive belt for driving a pulley (not shown) mounted on an automobile fan or the like (not shown) is generally designated 10 and includes a band or length of flexible belt material 11 having opposite distal ends 12 and 14. The band 11, which is trapezoidal in cross-section, may suitably comprise rubber or plastic belting material having parallel inner and outer surfaces 11a and 11b spanned by outwardly diverging side surfaces 11c. The band 11 may also represent a previously endless automobile drive belt, sometimes referred to as a V-belt, which has severed.

A receptacle or receiver, generally designated 16 and comprising resilient material, is coupled to the terminal belt end 12 via a crimpable ferrule 19 and a rivet 20. The receptacle 16 includes an upwardly inclined, internal, female receiver passage 22 which receives the distal, male belt end 14.

A recess 24 is provided internally of the receptacle 16, in communication with the passage 22, for a purpose to be immediately described.

A steel belt-retaining or gripping blade member 26 is mounted in a slot 28 provided in the upper end of the recess 24. The width of the slot 28 is slightly less than the width of the blade 26, such that the resilient material comprising receptacle 16 grips the upper end 26a of the blade 26 but permits swinging movement thereof from the position illustrated in solid lines in FIG. 3 to the position illustrated in chain lines in FIG. 3. The lower end 29 of blade 26 is normally disposed in the passage 22, in the position illustrated in solid lines, but is movable to the position illustrated in chain lines in FIG. 3 by belt end 14 as the belt end 14 is inserted into the passage 22. After the belt end 14 is fully inserted into the passage 22, the belt end is partially retracted to oppositely swing the blade 26 in the opposite direction to return the blade 26 to the position illustrated in solid lines in FIG. 3. The blade 26 includes a terminal knife edge 32. The length of blade 26 is greater than the distance between the upper belt surface 34 and the top 35 of slot 28 so that the knife edge 32 will bite or dig into the outer surface 11b of male belt end 14 when the blade 26 is in the position illustrated in solid lines in FIG. 3.

Figure 3:
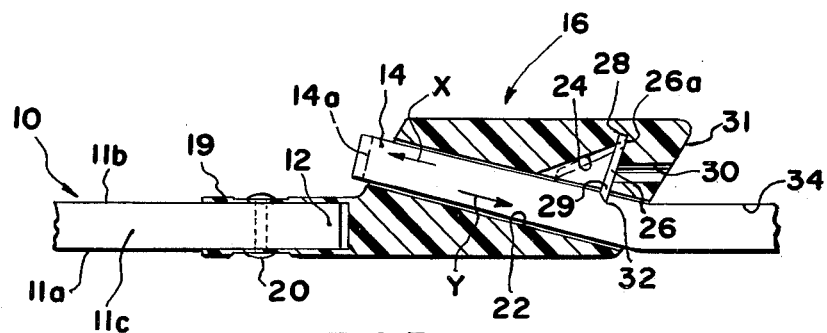
FIG. 3 is a sectional, side-elevational view taken along the line 3—3 of FIG. 2.

A release opening 30 is provided in the forward wall 31 of the receptacle 16 to permit a release bar, such as the blade of a screwdriver, or the like, (not shown) to forcibly move the belt-gripping blade 26 from the belt-gripping operative position illustrated in solid lines in FIG. 3 to the inoperative or removed position illustrated in chain lines in FIG. 3.

THE OPERATION

The belt or band 10 may represent a broken endless drive belt or a piece of belt material which is cut to the desired length. With apparatus constructed according to the present invention, the belting material can be installed in driving relation with the pulleys without the necessity of moving the pulleys.

The receptacle 16 is mounted on the belt end 12 via the ferrule 19, which is crimped into clamping engagement with belt end 12, and the rivet 20. Initially, the male belt end 14 will be in the removed position illustrated in FIG. 1. The male belt end 14 is moved into the female recess or passageway 22, in the direction represented by the arrow X. The terminal belt-gripping portion or knife edge 32, which is normally disposed in the path of the belt end 14, will be swung upwardly to the position illustrated in chain lines as the belt end 14 is inserted. In this position, the terminal knife edge 32 will bear against the upper belt surface 11b. After the belt end 14 is fully inserted and slight tension is applied to the length of belting material 11, the belt end 14 is moved in an opposite direction, represented by the arrow Y, to a slightly retracted position. When this occurs, the knife edge 32 bears against the upper belt surface 11b and will be pulled with the belt end 14, in the direction of arrow Y, to swing the belt-securing blade 26 from the position illustrated in chain lines to the position illustrated in solid lines in FIG. 3. At this time, the knife edge 32 will have "dug into" and slightly deformed, without piercing or severing, upper belt surface 34. Further outward movement of the male belt end 14 in the direction of arrow Y is prohibited by blade 26 bearing against the forward receptacle wall 31. Any remaining tension of the belt will aid in securing the belt ends in the positions illustrated in FIG. 3. Any excess material on male end 14 may then be severed along the chain line 14a.

To uncouple the belt ends 12 and 14, the user need only insert a pry bar or tool (not shown) in the release opening 30 to forcibly swing the blade 26 upwardly to the position illustrated in chain lines, so that the belt end 14 can be removed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:
1. An adjustable length pulley drive belt comprising:
flexible elongate pulley drive means, having a male end and an opposite end, for driving a pulley;
said opposite end including receiver means for receiving said male end, comprising:
resilient receiver means mounted on said opposite end including first and second longitudinally spaced oppossite ends, said first end of said receiver means being coupled to said opposite end of said flexible elongate pulley drive means;
said receiver means including a passage there throughh extending between said longitudinally spaced ends for receiving said male; end;
said passage being outwardly inclined in a direction away from said second end toward said first end of said receiver means and including an internal recess;
releasable securing blade means swingably mounted on said resilient receiver means in said recess for movement in a path transverse to the plane of said male end, between an inoperative position, permitting movement of said male end relative to said receiver means, and an operative position in which said securing blade means bites said male end to prevent removal of said male end from said receiver means;
said securing blade means including a belt-gripping knife edge end portion normally disposed in the path of said male end as said male end moves into said passage for movement thereby to said inoperative position in which said belt-gripping knife edge end portion bears against said male end, said securing blade means being movable by said male end from said inoperative position to said operative position when male end moves in an opposite direction away from said receiver means;
said receiver means including resilient mount means mounting an upper end of said blade means to normally urge said belt gripping end portion to said operative position, but permitting swinging movement thereof by said male end toward the inoperative position as said male end moves into said passage, and permitting limited movement of said male end in said opposite direction as said securing blade means moves from said inoperative position to said operative position such that said knife edge end portion grips said male end to inhibit further movement in said opposite direction when said securing blade means reaches said operative position;
the portion of said blade means between said upper end and said belt gripping end portion bearing against an end wall of said internal recess when said blade means is in said operative position;
a release aperture being provided in said receptacle means in communication with said internal recess, said release aperture extending from said second end of said receiver means to said end wall of said internal recess to permit access to said securing blade means and to move said securing blade means from said operative position to said inoperative position.

* * * * *